United States Patent Office 3,509,133
Patented Apr. 28, 1970

3,509,133
6-SUBSTITUTED MORPHANTHRIDINES
Claude I. Judd, Mequon, and Alexander E. Drukker, Milwaukee, Wis., assignors to Colgate-Palmolive Company, New York, N.Y., a corporation of Delaware
No Drawing. Continuation-in-part of application Ser. No. 502,363, Oct. 22, 1965. This application Dec. 11, 1968, Ser. No. 783,144
Int. Cl. C07d 41/08
U.S. Cl. 260—239
9 Claims

ABSTRACT OF THE DISCLOSURE

The compounds are 6-basic substituted morphanthridines which are useful as pharmaceutical agents, especially central nervous system depressants. In addition they are useful as intermediates in the preparation of 2,3-dihydroimidazo[1,2-a]morphanthridines which are in turn useful as anticholinergic, antihistaminic and psychopharmacologic agents and as intermediates in the preparation of pickling, wood preserving and mothproofing agents. Representative compounds disclosed are 6-aminomorphanthridine, 6-(2-hydroxyethylamino)morphanthridine and 6-(2-chloroethylamino)morphanthridine.

RELATED APPLICATIONS

This application is a continuation-in-part of our earlier copending applications Ser. No. 444,025 filed Mar. 30, 1965 now U.S. Patent No. 3,435,042 and Ser. No. 502,363 filed Oct. 22, 1965.

DESCRIPTION OF THE INVENTION

The compounds of the present invention may be represented by the following formula

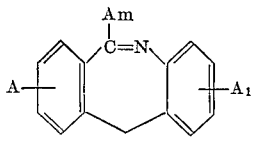

wherein A and $A_1$ are selected from the group consisting of hydrogen, a halo group such as chloro and bromo and trifluoromethyl and Am is hydrazino or

wherein $R_1$ and $R_2$ are the same or different groups selected from the group consisting of hydrogen, a lower alkyl of 1 to 4 carbon atoms, such as methyl, ethyl, propyl, isopropyl or butyl, a hydroxy-lower alkyl such as 2-hydroxyethyl, a halo-lower alkyl such as 2-chloroethyl, an aralkyl of 7 to 13 carbon atoms, especially phenyl-lower alkyl such as benzyl, phenethyl and phenylisopropyl.

The compounds of the present invention may be prepared by reacting a 5,6-dihydro-6-morphanthridone with phosphorous pentachloride to form the corresponding 6-chloromorphanthridine, which upon treatment with a suitable amine yields the desired 6-amino derivative.

The described process may be illustrated as follows:

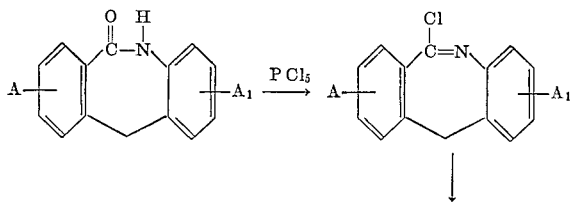

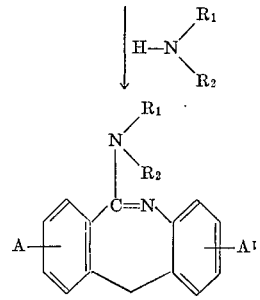

wherein A, $A_1$, $R_1$ and $R_2$ are as previously defined.

Representative of the 5,6-dihydro-6-morphanthridones which can be employed in the process are:

5,6-dihydro-6-morphanthridone,
2-chloro-5,6-dihydro-6-morphanthridone, and
2-trifluoromethyl-5,6-dihydro-6-morphanthridone.

The 5,6-dihydro-6-morphanthridones may be prepared as described in U.S. Patent No. 2,973,354.

Representative of the 6-halo morphanthridines which may be used as starting materials are the following:

6-chloromorphanthridine,
2,6-chloromorphanthridine, and
2-trifluoromethyl-6-chloromorphanthridine.

Representative of the compounds which may be used in the described process are the following:

ammonia,
hydrazine,
methylamine,
aminoethanol,
2-aminopropanol,
1-amino-2-propanol,
3-amino-3-hydroxymethylpentane,
ethylamine,
benzylamine,
dimethylamine,
methyl benzylamine, and
dibenzylamine.

Representative of the compounds which may be produced by practice of the above described process are the following:

6-aminomorphanthridine,
6-hydrazinomorphanthridine,
6-(2-hydroxyethylamino)morphanthridine,
6-(2-hydroxyisopropylamino)morphanthridine,
6-(3-hydroxymethyl-3-pentylamino)morphthanthridine,
2-chloro-6-(2-hydroxyethylamino)morphanthridine,
6-methylaminomorphanthridine,
6-(N-methyl-N-benzylamino)morphanthridine,
6-(2-chloroethylamino)morphanthridine,
6-(N,N'-dibenzylamino)morphanthridine, and
6-(2-chloro-2-isopropylamino)morphanthridine.

The compounds in which $R_1$ is H and $R_2$ is 2-hydroxyalkyl or 2-haloalkyl may be employed as intermediates to prepare the corresponding dihydroimidazomorphanthridines, which in turn can be converted to the 8-amino alkyl derivatives which are compounds of known pharmaceutical utility.

The aminoalcohol derivatives may be converted to the corresponding dihydroimidazomorphanthridines by heating the selected derivative for an extended period of time at an elevated temperature, for example, up to and exceeding 200° C. The 2-haloethyl derivatives may be converted to the dihydroimidazomorphanthridines by dissolving the selected haloethyl derivative in a suitable solvent such as methanol in the presence of a base and heating the mixture at reflux temperature to effect a ring closure.

The described processes may be illustrated as follows:

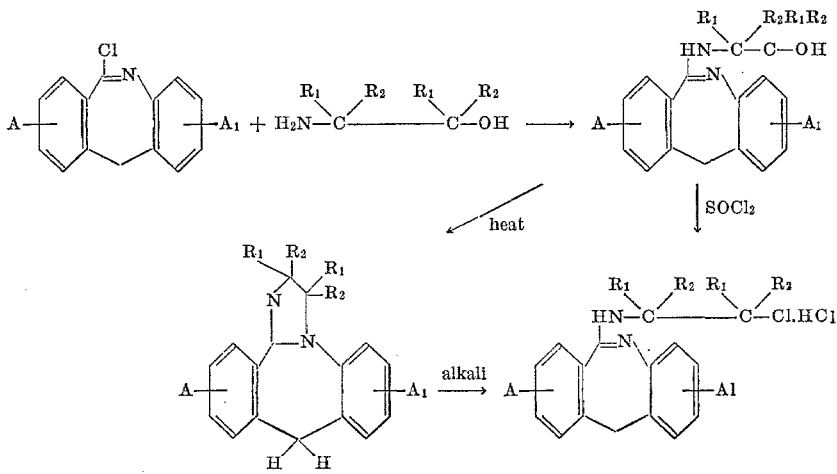

wherein all symbols are as previously defined and do not partake in or interfere with the reactions.

The compounds of the present invention are basic in nature and form water soluble acid addition salts with such inorganic or organic acids as hydrochloric acid, hydrobromic acid, sulphuric acid, maleic acid, succinic acid, and cyclohexyl sulfamic acid. The compounds also form lower alkyl quaternary ammonium salts with compounds such as methyl chloride and ethyl bromide.

The novel compounds of the present invention are central nervous system depressants. For example, the compound 6 - (2 - hydroxyethylamino)morphanthridine when administered in doses of 3 to 300 mg./kg. intraperitoneally to mice produces a behavioral profile characterized by depression of alertness, reactivity, locomotion and muscle tone. As a result of the behavioral tests the compound was found to have an $LD_{50}$ in excess of 500 mg./kg. intraperitoneally. The behavioral studies were conducted in accordance with the procedure set forth by Irwin in "Animal and Clinical Pharmacologic Techniques in Drug Evaluation," J. H. Nodine and P. E. Siegler, Ed. Year Book Publishers, Inc., 1964, pp. 36–54. When employed pharmaceutically the compounds or their nontoxic salts are preferably combined with one or more pharmaceutical diluents and formed into unit dosage forms. Such unit dosage forms may be made for either oral or parenteral administration.

Among the pharmaceutical carriers or diluents which may be employed are such conventional carriers as starch, sugar, talc, magnesium stearate, gelatin, and flavoring and disintegrating agents.

When intended for parenteral administration the preferred carrier is Water for Injection, U.S.P. If the compound is not soluble in water suitable organic solvents such as ethylene glycol may be used.

The unit dosage forms such as tablets or capsules will generally contain a concentration of 0.1% to 10% by weight of one or more of the active ingredients. While the exact daily dosage of the active ingredient will depend upon many factors such as the severity of the patient's condition it will generally range from 10 to 250 mg. per day.

A typical tablet may have the following composition:

| | Mg. |
|---|---|
| 6-(2-hydroxyethylamino)morphanthridine | 20 |
| Lactose U.S.P. | 136.5 |
| Corn starch | 20 |
| Corn starch (as 10% starch paste) | 3.4 |
| Magnesium stearate | 1.3 |

The tablets are formed using a 5/16 inch diameter punch for compression.

Capsules may be prepared by filling No. 3 hard gelatin capsules with the following ingredients.

| | Mg. |
|---|---|
| 6-(2-hydroxyethylamino)morphanthridine | 20 |
| Lactose U.S.P. | 200 |
| Starch U.S.P. | 16 |
| Talc U.S.P. | 8 |

In addition to their use as pharmaceuticals and intermediates in the preparation of pharmaceuticals, the compounds may be used to prepare pickling, wood preserving and moth-proofing agents. The thiocyanic acid addition salts of the compounds of this invention, when condensed with formaldehyde form resinous materials useful as pickling agents in accord with U.S. Patents Nos. 2,425,320 and 2,606,155. The fluosilicic acid addition salts are useful as mothproofing agents according to U.S. Patents 1,915,334 and 2,075,359.

The following examples are presented to illustrate the practice of this invention:

Example 1.—6-chloromorphanthridine

A mixture of 20.9 g. (0.1 mole) of 5,6-dihydro-6-morphanthridone and 29 g. phosphorus pentachloride is heated in a 130° oil bath for 2 hours. When the mixture becomes liquid, hydrochloric acid escapes and phosphorus oxychloride begins to reflux. The phosphorus oxychloride which forms and the excess phosphorus pentachloride are distilled off at 18 mm. and the residue is fractionated through a short column to give a crude 6-chloromorphanthridine, B.P. 162° (0.2 mm.). A small amount is refractionated and a fraction obtained of 6-chloromorphanthridine, B.P. 132° (0.025 mm.).

*Analysis.*—Calcd. for $C_{14}H_{10}ClN$ (percent): C, 73.85; H, 4.43; N, 6.15; Cl, 15.57.

Example 2.—6-aminomorphanthridine

Into a solution of 45.6 g. (0.2 mole) of 6-chloromorphanthridine in 200 g. of phenol, which is kept at 100°, is passed a stream of dry ammonia for 6 hours. The phenol is removed by distillation and the residue extracted into benzene. Treatment of this benzene solution with 10% hydrochloric acid results in the separation of the solid hydrochloride, which is filtered and recrystallized from isopropanol. The crystalline hydrate is dehydrated by drying in vacuo at 110° to give 29.3 g. (59%) of 6-aminomorphanthridine hydrochloride, M.P. 204–206°.

*Analysis.*—Calcd. for $C_{14}H_{13}ClN_2$ (percent): C, 68.71; H, 5.35; Cl, 14.49; N, 11.46. Found (percent): C, 68.77; H, 5.35; Cl, 14.48; N, 11.31.

Example 3.—6-hydrazinomorphanthridine

To a solution of 50 ml. of 85% hydrazine hydrate in 500 ml. of ethanol is added 11.4 g. (0.05 mole) of 6-chloromorphanthridine. The solution is left at room temperature for 48 hours and concentrated. Water (500 ml.) is added, a yellow green gum which forms is extracted with benzene, the benzene solution extracted with dilute hydrochloric acid, the aqueous acid solution made basic with potassium hydroxide and extracted again with benzene. The benzene solution is dried over sodium sulfate, filtered, and concentrated to give 11.35 g. of base. The base is converted to the oxalate salt, using warm ethanol as a solvent, and the salt recrystallized from 90% aqueous methanol to give the hydrogen oxalate, M.P. 203°.

*Analysis.*—Calcd. for $C_{16}H_{15}N_3O_4$ (percent): C, 61.33; H, 4.83; N, 13.41; oxalic acid, 28.74.

Example 4.—6-(2-hydroxyethylamino)morphanthridine

To 122 g. (2 moles) of 2-aminoethanol in 250 g. of molten phenol is added 28.4 g. (0.124 mole) of 6-chloromorphanthridine and the mixture is stirred at 150–160° for 14 hours. Most of the excess aminoethanol and phenol are removed by distillation under reduced pressure on a steam bath. The rest is treated with dilute sodium hydroxide. The solid residue is dissolved in 250 ml. of dichloromethane and extracted with 250 ml. of 1 N hydrochloric acid. The aqueous layer is separated, made alkaline with potassium hydroxide and the solid which separates is collected, dried, and recrystallized from 500 ml. of ethanol to give 6-(2-hydroxyethylamine)morphanthridine, M.P. 204–205°. Repeated crystallizations from ethanol raised the melting point to 205–207°.

*Analysis.*—Calcd. for $C_{16}H_{16}N_2O$ (percent): C, 76.16; H, 6.39; N, 11.10. Found (percent): C, 76.21; H, 6.17; N, 11.09.

Example 5—6-(2-chloroethylamino)morphanthridine hydrochloride

A solution of 11.6 g. (0.0417 mole) of 6-(2-hydroxyethylamino)morphanthridine and 300 ml. of chloroform is brought to pH 1.0 with anhydrous hydrogen chloride. Thionyl chloride (11.6 g.; 0.098 mole) is added dropwise, and the reaction mixture is stirred and refluxed for 3 hours. After removal of the solvent and excess thionyl chloride, the resulting yellow oil is crystallized from 400 ml. of Skelly C. After recrystallization from ethanol and ether, the salt 6-(2-chloroethylamino)morphanthridine hydrochloride is obtained, M.P. 184–186°.

*Analysis.*—Calcd. for $C_{16}H_{16}Cl_2N_2$ (percent): C, 62.55; H, 5.25; N, 9.13; Cl, 23.08. Found (percent): C, 62.32; H, 5.26; N, 9.05; Cl, 23.63.

Example 6.—2,3-dihydroimidazo[1,2-a]morphanthridine

A solution of 52 g. (0.17 mole) of 6-(2-chloroethylamino)morphthanthridine hydrochloride in 2 liters of methanol is treated with 84 ml. of 5 N sodium hydroxide and the solution is heated to reflux for 3 hours. The solution is concentrated, treated with water, extracted with ether, washed with water, and concentrated to give 2,3-dihydroimidazo [1,2-a]morphanthridine, M.P. 161–163°.

Example 7.—8-(3-dimethylaminopropyl)-2,3-dihydroimidazo[1,2-a]morphanthridine To a solution of 11.7 g. (0.05 mole) of 2,3-dihydroimidazo[1,2-a]morphanthridine in 250 ml. of tetrahydrofuran is added 40 ml. of butyl lithium solution (0.06 mole) in 150 ml. of ether. The resulting dark green solution is stirred for 5 hours at room temperature after which a solution of 0.05 mole of dimethylaminopropyl chloride in 25 ml. of ether is added dropwise. The solution is stirred for 20 hours at room temperature, 25 ml. of water is added, the organic layer is separated, dried, concentrated, and distilled to give 8-(3-dimethylaminopropyl)-2,3-dihydroimidazo[1,2-a]morphanthridine, B.P. 220–227° C. (1.3 mm.).

*Analysis.*—Calcd. for $C_{21}H_{25}N_3$ (percent): C, 78.96; H, 7.89; N, 13.15. Found (percent): C, 78.74; H, 8.11; N, 13.15.

We claim:
1. A member selected from the class consisting of compounds of the formula and acid addition salts thereof, wherein A and $A_1$ are selected from hydrogen, halo and trifluoromethyl, Am is hydrazino or in which $R_1$ is hydrogen and $R_2$ is selected from hydroxy-lower alkyl and halo-lower alkyl.

2. A compound of claim 1 in which $R_1$ is hydrogen and $R_2$ is chloroethyl.
3. A compound of claim 1 in which $R_1$ is hydrogen and $R_2$ is hydroxyethyl.
4. A compound of claim 1 in which A and $A_1$ are hydrogen or chloro.
5. A compound of claim 1 in which A and $A_1$ are hydrogen or chloro, $R_1$ is hydrogen and $R_2$ is hydroxyethyl.
6. A compound of claim 1 in which A and $A_1$ are hydrogen or chloro, $R_1$ is hydrogen and $R_2$ is chloroethyl.
7. A compound of claim 1 in which A and $A_1$ are hydrogen and Am is hydrazino.
8. A compound of claim 1 in which A and $A_1$ are hydrogen, $R_1$ is hydrogen and $R_2$ is hydroxyethyl.
9. A compound of claim 1 in which A and $A_1$ are hydrogen, $R_1$ is hydrogen and $R_2$ is chloroethyl.

References Cited

Derwent Pharmaceuticals Documentation, Specification Book No. 320, pages 265–274, printing S. African Prov. Spec. 64/2568, published Dec. 15, 1964.

ALTON D. ROLLINS, Primary Examiner

U.S. Cl. X.R.

252—142; 260—239.3, 309.7; 424—37, 244